Figure 1:
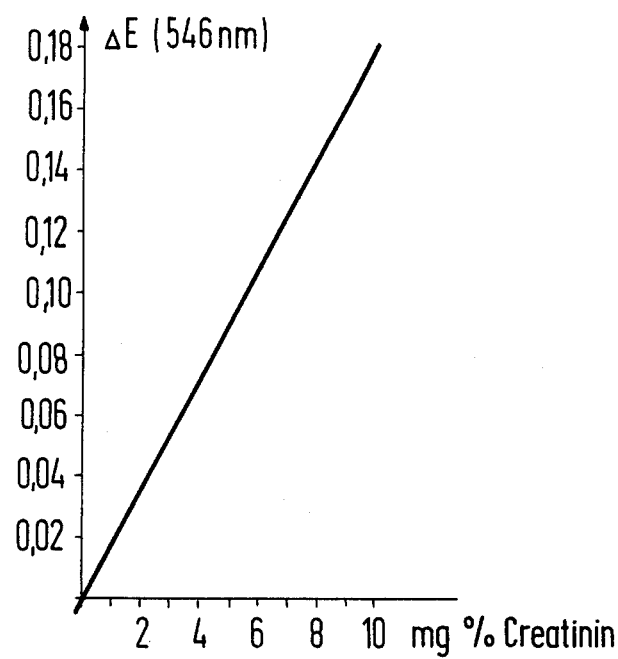

United States Patent [19]

Möllering et al.

[11] 3,907,644

[45] Sept. 23, 1975

[54] CREATININE AMIDOHYDROLASE COMPOSITION AND PROCESS FOR THE DETERMINATION OF CREATININE

[75] Inventors: Hans Möllering; Klaus Beaucamp; Michael Nelboeck-Hochstetter; Hans Ulrich Bergmeyer, all of Tutzing, Germany

[73] Assignee: Boehringer Mannheim G.m.b.H., Mannheim, Germany

[22] Filed: Nov. 13, 1973

[21] Appl. No.: 415,463

Related U.S. Application Data

[60] Continuation-in-part of Ser. Nos. 247,184, April 24, 1972, abandoned, and Ser. No. 411,526, Oct. 31, 1973, which is a division of Ser. No. 249,589, May 2, 1972, Pat. No. 3,806,416.

[30] Foreign Application Priority Data

May 5, 1971 Germany............................ 2122255
May 5, 1971 Germany............................ 2122298

[52] U.S. Cl................ 195/99; 195/103.5 R; 195/29
[51] Int. Cl.²......................................... G01N 31/14
[58] Field of Search........ 195/103.5 R, 29, 99, 66 R

[56] References Cited
OTHER PUBLICATIONS

Tanzer et al., The Journal of Biological Chemistry, Vol. 234, No. 12, Dec. 1959, pp. 3201–3204.

*Primary Examiner*—Alvin E. Tanenholtz
*Attorney, Agent, or Firm*—Burgess, Dinklage & Sprung

[57] ABSTRACT

Creatinine is determined by use of a novel enzyme, creatinine amidohydrolase, which converts the creatinine in a creatinine-containing sample to creatine, the latter being determined in conventional manner as a measure of the creatinine originally present. The ability of the enzyme to convert creatinine to creatine can also be utilized to monitor the efficacy of enrichment processes for recoverying the enzyme, by sampling the product of each step of such process and determining its ability to convert excess creatinine added thereto to creatine, as a measure of the activity of the enzyme present in such product.

25 Claims, 2 Drawing Figures

CREATININE AMIDOHYDROLASE COMPOSITION AND PROCESS FOR THE DETERMINATION OF CREATININE

This application is a continuation-in-part of Ser. No. 247,184, filed Apr. 24, 1972 now abandoned and of Ser. No. 411,521 filed Oct. 31, 1973, the latter being a divisional of Ser. No. 249,589, filed May 2, 1972, and issued as U.S. Pat. No. 3,806,416 on Apr. 23, 1974. The instant application contains only subject matter disclosed in said prior cases and may thus be conveniently viewed as a consolidation of Ser. No. 247,184 and Ser. No. 411,526.

The invention is concerned with two new enzymes, creatinine amidohydrolase and creatine amidinohydrolase, with methods of determining creatinine utilizing creatinine amidohydrolase, and with a novel method for monitoring processes for the enrichment of such enzymes from microorganisms.

In clinical chemistry, especially for the functional diagnosis of the kidney, the determination of the intermediate and end products of protein metabolism play an important part. In the determination of creatinine in the serum or in the so-called clearance test, the simultaneous determination in the serum and urine is one of the standard methods of investigation used in clinical laboratories. The products of this metabolism include creatinine and creatine. Furthermore, the determination of the creatinine content of certain foodstuffs and animal feeds is also of importance. Methods for the determination of creatinine have already been frequently described. Most of the known methods are based on the non-enzymatic Jaffe reaction which, however, suffers from the disadvantage of being non-specific.

The Jaffe method is based on the color reaction of creatinine with picric acid in an alkaline medium. After acidic deproteinization of the sample with, for example, trichloroacetic acid or picric acid, in the supernatant there is obtained, after the addition of picric acid and alkalization, a coloration, which is measured photometrically. An important disadvantage of this simple method is, however, that it is not specific for creatinine.

A number of modifications of the Jaffe reaction admittedly improve the degree of precision and the carrying out thereof but without removing this principal disadvantage. The Jaffe method remains very subject to disturbance and even slight displacements in the hydrogen or hydroxyl ion concentration result in an alteration of the color depth.

According to another known method, creatinine is converted, with the addition of o-nitrobenzaldehyde, into methyl-guanidine, which is then determined by the Sakaguchi reaction. Furthermore, a color reaction between creatinine and potassium mercury thiocyanate has also been described. However, both methods prove to be unsuitable for use in clinical laboratories.

A modification of the Jaffe reaction has been described by Dubos and Miller (J. Biol. Chem., 121, 457/1937) in which, using a crude extract of a certain bacterium, creatinine is decomposed in an aliquot of a sample, whereas the remainder of the sample remains untreated. In both parts of sample, a creatinine determination is carried out by Jaffe's methodand the creatinine content determined from the difference of the extinctions. This method is admittedly very specific but it is very laborous to carry out and the bacterium used has to be continuously cultered.

Furthermore, there has also been described a specific microbiological method of determination of creatinine with the use of isolated bacteria in which washed cell suspensions were used for the measurement of the creatinine and the formation of urea and ammonia was used as a measure of the enzyme action. However, it was not possible to obtain soluble enzyme extracts capable of breaking down creatinine. A prerequisite for the provision of a specific creatinine determination with the help of enzymes is, however, the discovery of appropriate soluble enzymes which can catalyze specific and measurable reactions of creatinine. With this object in view, experiments have been carried out with, for example, Corynebacterium, *Pseudomonas aeroginosa, Pseudomonas ovalis, Pseudomonas eisenbergii* and Clostridia, but all of these experiments were unsuccessful.

Roche, Lacombe and Girard (BBA 6, 210/1850) characterized, in two types of Pseudomonas, creatinase, creatininase and a glycocyaminase as specific enzymes which liberate urea from their substrates from the guanidino group. Furthermore, Akamatsu et al., (Enzymologia, 15, 122, 158, 173/1951) found, in soil bacteria, an enzyme which they called creatinemutase and which brings about the equilibrium adjustment between creatinine and creatine. The following course of breakdown of the creatinine was assumed:

$$\text{Creatinine} \rightleftharpoons \text{creatine} \rightarrow \text{urea and}$$
$$\text{sarcosine} \rightarrow \text{glycine} \rightarrow NH_3$$

We have now found and isolated, in a state of high purity, two enzymes in microorganisms, which enzymes appear to decisively participate in the breakdown of cretainine, viz., a creatinine amidohydrolase and creatine amidinohydrolase.

The present invention thus provides two new enzymes, as well as a process for the isolation and purification thereof.

Further, the present invention provides a method of determining creatinine by utilizing the ability of the enzyme creatinine amidohydrolase to catalyze the conversion of creatinine to creatine and thus detering the creatine formed in known manner.

In addition, this invention provides a process for obtaining creatinine amidohydrolase and creatine amidohydrolase from microorganisms. The process essentially comprises culturing a microorganism in a creatinine-containing medium, digesting same and obtaining the creatinine amidohydrolase in pure form from the water-soluble digestion fraction by known biochemical purification and fractionation methods carried out at a pH value above 7.0, with the use of a test in which creatine formed from added creatinine is determined in known manner. Thereafter, if desired, any creatine amidinohydrolase present is separated by exchange chromatography from the creatinine amidohydrolase obtained.

The following reactions are catalyzed by the two enzymes provided by the present invention:

(a) creatinine + $H_2O$ 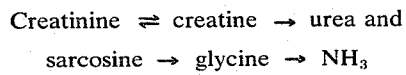 creatine (b) creatine + $H_2O$ 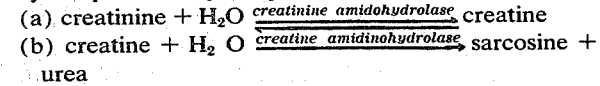 sarcosine + urea Since equation (a) is that of an equilibrium reaction with the taking up or removal of water, the enzyme which participates in this reaction is called creatinine amidohydrolase.

According to the above aspect of the present invention, there is provided a method for the specific determination of creatinine.

Essentially, this method of the invention comprises incubating an aqueous creatinine-containing solution with creatinine amidohydrolase at a pH value between about 7.5 and 9 and determining either the creatine formed or the decrease of creatinine in known manner.

The creatinine-determination method according to the present invention is preferably carried out at a pH value between 7.8 and 8.3. For the adjustment of the pH value, any desired buffers can be used. However, care is to be taken that the buffer used does not disturb the subsequent method of determination. When, for example, the creatinine difference is subsequently to be determined by Jaffe's method, the buffer used should not diminish the Jaffe reaction. Glycine and glycylglycine buffers are, for example, unsuitable, whereas phosphate and pyrophosphate buffers do not have a disturbing effect. If however, the creatine formed is to be determined with creatine kinase and ATP, then glycine buffer and similar buffers can also be used. For carrying out the method according to the present invention, a previous deproteinisation of the sample is not necessary. However, a deproteinisation can be expedient for the subsequent determination of the creatine.

According to a preferred embodiment of the method, creatine formed is converted, with the use of the enzyme creatinase, into sarcosine and urea and the latter determined according to known methods. The enzyme creatinase can systematically also be classified as creatine amidinohydrolase. This preferred embodiment of the method according to the present invention is preferably carried out by using for the determination an enzyme preparation containing a mixture of creatininase and creatinase.

If the creatine formed is determined in known manner, with the use of creatinkinase and ATP, then a deproteinization is advantageous since the sensivitiy of the test is thereby increased. This greater sensitivity depends upon the fact that, in the case of deproteinization, it is possible to work in a more concentrated form so that the extinction difference, referred to a certain amount of creatine, is increased.

The use of an enzyme mixture containing creatinine amidohydrolase and creatinase is also of advantage when the determination of the creatinine is carried out by Jaffe's method because, due to the presence of the creatinase, the equilibrium is displaced in favor of the formation of creatine.

The present invention also provides a new reagent combination for the specific determination of creatinine. The reagent combination according to the present invention comprises:

1. a creatinine standard
2. picric acid
3. an aqueous solution of sodium hydroxide and
4. creatinine amidohydrolase alone or together with buffer and optionally in admixture with creatinase, in an unmixed state before use.

A further reagent combination according to the present invention comprises:

1. a buffer, reduced nicotinamide-adeninedinucleotide (NADH), ATP and phosphoenol pyruvate (PEP)
2. lactate dehydrogenase (LDH), pyruvate kinase, (PK) and magnesium chloride
3. creatine kinase (CK) and
4. creatinine amidohydrolase in an unmixed state before use.

The method according to the present invention and the reagent combinations according to the present invention provide, for the first time, the possibility of carrying out a specific creatinine determination which can also be used routinely in clinical laboratories and possess a sufficient degree of sensitivity for practical purposes. The only previously known specific ethod for the determination of creatinine according to Miller and Dubos cannot, however, be used for routine investigations (cf. R. J. Henry, Clinical Chemistry, 1964, page 288).

As starting material for obtaining the two new enzymes, there can, in general, be used microorganisms in which the desired enzymes are adaptively enriched, this usually taking place by culturing the microorganisms in the presence of or with the addition of creatinine (see the examples, infra).

A water-soluble fraction is obtained by digestion of the microorganism so obtained. The usual digestion methods can be used, depending upon the strength or resistance of the cell membrane of the microorganism used. High pressure dispersion and ultrasonic digestion have proved to be especially useful. Further examples of digestion methods include the use of disintegration mills, for example those of Balutini and Schlossmann, and digestion methods working on a similar basis. Chemical or enzymatic digestion methods can also be used.

The creatinine amidohydrolase can be enriched from the so obtained water-soluble fraction by known biochemical purification methods, by utilizing its ability to convert creatinine into creatine for testing the result of any biochemical purification method used. The creatine formed can be determined by known methods, for example, by the addition of adenosine triphosphate and measurement in the usual way of the adenosine disphosphate formed. It is, however, necessary to operate at pH values above 7 and to select a purification method which can be used at these pH values.

According to a further method of following the progress of the enrichment process, the creatine formed is split with creatine amidinohydrolase, with the formation of sarcosine and urea, and then to determine the urea in the usual way, for example, by the use of urease.

The extent to which the purification is carried out depends upon the intended use of the enzyme or enzymes. If if is desired to obtain a preparation suitable for the enzymatic determination of creatinine, a single purification step suffices. Examples of such purification steps include a polyanion treatment, fractionation with organic solvents or chromatography. With the use of the above-mentioned methods of determination, it is possible, in a simple manner to ascertain the content of the desired enzyme and to enright it to a considerable extent in a single step.

Since a comparatively long storage of the collected and frozen microorganisms could lead to a decrease of activity of the desired enzymes, the cells are preferably further worked up as quickly as possible after collection. Two microorganisms preferred for carrying out the process of the present invention are *Alcaligenes spec.* WS 51400 of the family Achromobactericeae and *Penicillium* WS 90001. These two microorganisms are deposited, under the stated numbers, in the collection of the Bacteriological Institute of the Technical University, Munich, Germany, at Weihenstephan.

*Alcaligenes spec.* WS 51400 possesses the following properties: strictly oxidative gram-negative, short rodlets with peritrichous flagellation. The microorganism is weakly oxidase-positive, alkalizes litmus milk and is capable of denitrification. Furthermore, the following properties have been ascertained:

| growth at 4°C. | − | m-inositol | − |
| growth at 41°C. | − | glycollate | − |
| gelatine liquifaction | − | pelargonate | − |
| tributyrin fission | − | adipate | − |
| egg yolk reaction | − | p-hydroxybenzoate | + |
| pigment formation | − | phenylacetate | − |
| fermentation of: | | valine | − |
| arabinose | + | arginine | (+) |
| glucose | + | δ-aminovalerate | − |
| maltose | (+) | tryptophane | − |
| cellobiose | (+) | betain | + |
| trehalose | + | hippurate | − |
| 2-ketogluconate | + | acetamide | − |
| mannitol | (+) | benzylamine | − |

According to present knowledge, this microorganism belongs to the Achromobacteraceae family and is to be assigned, with great probability, to the genus Alcaligenes.

The other preferred microorganism, namely WS 90001, is a fungus of the Penicillium genus.

In order adaptatively to enrich the desired enzymes in the microorganisms to be used according to the present invention, these are preferably cultured with the addition of creatinine to the nutrient medium. The microorganisms are advantageously allowed to grow on a nutrient substrate which contains glucose or glycerol, as a source of carbon and creatinine, as well as salts and vitamins in the amounts and compositions known in microbiology. An especially preferred nutrient medium has the following composition:

| 0.5 | wt.% | glucose or glycerol |
| 0.5 | wt.% | creatinine |
| 0.08 | wt.% | ammonium sulfate |
| 0.02 | wt.% | magnesium sulfate hydrate |
| 0.05 | wt.% | yeast extract |
| 1 mg. | | nicotinic acid |
| 1 mg. | | thiamine-p-aminobenzoic acid |
| 1 mg. | | vitamin B$_6$ |
| 0.1 mg. | | biotin | together with traces of iron sulfate, calcium chloride and manganese sulfate, dissolved in M/10 potassium phosphate buffer with a pH of 6 in the case of the Penicillium or with a pH of 7 in the case of Alcaligenes.

A strain of the microorganisms to be used according to the present invention is obtained in the usual way on agar tilted tubes by the addition of 2 percent agar to a suitable nutrient substrate, preferably to the above-described nutrient substrate, to which 5 ml./litre of a 0.05 percent bromothymol blue solution is also added. Under optimum growth conditions, the indicator changes color, in the case of the Penicillium after 4 to 6 days and in the case of the Alcaligenes in 2 to 3 days. The color change is clearly into the alkaline region, brought about by the breakdown of creatinine and creatine. Creatinine-utilizing microorganisms which do not bring about the breakdown according to the above-mentioned metabolic scheme with the above-mentioned enzymes, do not bring about this alkalization.

The microorganisms to be used according to the present invention permit the econmic production of creatinine amidohydrolase and creatine amidinohydrolase from the water-soluble protein fractions obtained from a digest of the microorganisms.

Since the creatinine amidohydrolase and also creatine amidinohydrolase quickly lose their activity at pH values of 6 and below and exhibit the greatest stability at pH values of about 8.0, the digestion is preferably carried out with the use of an alkaline buffer, 0.1M potassium phosphate buffer (pH 8.0) being preferably used. The buffer and the buffer concentration used should preferably be such that any further enrichment of the enzymes can also be carried out in the buffer used for the digestion. When carrying out the digestion by high pressure dispersion, usually at about 700 to 800 ats., further purification can, when using a polyanion treatment, be carried out without previous separation of the cell residues. Examples of polyanions which can be used include protamine sulfate and watersoluble polyethyleneimines. It is preferred to add a watersoluble polyethyleneimine, for example, in the form of a 10 percent solution of pH 8. When using solution of this concentration, an about 5 percent addition thereof, referred to the digest volume, is necessary to achieve complete precipitation. The precipitate can then be separated by physical means, for example, by filtering or centrifuging, the desired enzymes remaining in the supernatant.

Instead of a polyanion precipitation, a precipitation with organic solvents can also be advantageous, isopropanol preferably being used. In this case, the cell residues are first removed after the digestion and then the organic solvent is added at ambient temperature. The isopropanol fractionation is preferably so carried out that at about 25°C., 800 ml. of 90 percent isopropanol is added per litre of digest solution and the precipitate separated off. The supernatant obtained is again mixed with 500 ml. isopropanol per litre and the precipitate, which contains the two desired enzymes, separated off.

A combined use of the two above-mentioned methods, namely polyanion precipitation and subsequent fractionation with organic solvents, is especially preferred.

Not only the products obtained with a single enrichment step but also those with the two combined steps are sufficiently pure for use in a specific creatinine determination. The enzymes creatinine amidohydrolase and creatine amidinohydrolase are hereby always obtained in a mixture. If it is desired to separate the enzymes, the preparation so obtained is subsequently separated by exchange chromatography a weakly basic ion exchanger, such as diethylaminoethyl-Sephadex or diethylaminoethyl-cellulose having proved to be especially useful.

The enzymes are adsorbed on the exchanger, for example on diethylaminoethyl-"Sephadex," at a low ion concentration, preferably below 0.1M and more preferably of about 0.01 to 0.05M. Subsequently, the exchanger is washed with an ion concentration of about 0.1M, non-active accompanying proteins thereby being removed. Creatinine amidohydrolase can then be eluted with 0.2M buffer solution, whereas the creatine amidinohydrolase still remains on the exchanger. It can also be eluted by increasing the ion concentration to 0.5M, for example, by using 0.2M potassium phosphate buffer (pH 8.0) with a content of 0.3M sodium chloride or potassium chloride or a similar salt.

The above-described preferred embodiment of the process according to the present invention, which combines an isopropanol fractionation with an exchange chromatography, leads to an approximately 100 to 150 fold enrichment of the enzymes and gives a creatinine amidohydrolase preparation with a specific activity of more than 200 U/mg. The creatine amidinohydrolase is hereby enriched about 100 fold, a preparation with an activity of 3U/mg. being obtained.

According to another embodiment of the process according to the present invention, a very simple high purification of the desired enzymes can be obtained without separation when, in a batch process, sufficient exchanger is added to adsorb both enzymes. The exchanger is then separated and thereafter washed and subsequently eluted in the manner described above.

A further possibility for the purification and enrichment of the two enzymes is by means of salt precipitation or salt fractionation, for example, with the use of ammonium sulfate. Thus, when using ammonium sulfate, creatinine amidohydrolase precipitates at a concentration of 2.2M and creatine amidinohydrolase or the mixture of the two enzymes at a concentration of 2.7M.

Salt precipitation can also be used for obtaining the enzymes from solutions thereof, such as are obtained, for example, by elution of the exchanger. By dialysis at about 4°C., expediently against diluted buffer, for example 0.02M diethanolamine buffer (pH 8.0), the enzymes can be freed from salts and other low molecular weight accompanying materials.

The preparations so obtained can be stored for several months in a frozen state, without loss of activity.

If only creatinine amidohydrolase is desired, a further purification and enrichment step can also comprise a heating step at 60°C. Such heating for a period of 5 minutes does not lead to any noticeable reduction of the creatinine amidohydrolase activity. However, in contradistinction thereto, the creatine amidinohydrolase loses its activity under these conditions.

The new enzymes according to the present invention can be used for scientific purposes, as well as for the specific determination of creatinine and creatine.

The following Examples are given for the purpose of illustrating the present invention:

EXAMPLE 1

Determination of creatinine with subsequent use of the Jaffe reaction 1.0 ml. of a creatinine-containing sample (serum or diluted urine) was incubated at 37°C. for 45 to 60 minutes in 0.050 to 0.2M buffer (the preferred buffers are pyrophosphate, phosphate, diethanolamine/hydrochloric acid or glycylglycine/hydrochloric acid buffer) with creatinine amidohydrolase in an amount of at least 5 U/test (1U = 1 μmol substrate reaction/min.) and creatinase in an amount of at least 0.8 U/test. The test sample was then deproteinized with 3M trichloroacetic acid, together with a sample to which no enzyme mixture has been added. The Jaffe reaction was carried out with the supernatant of the two samples. The extinction difference of the two samples at 546 nm gives the amount of creatinine, with reference to a creatinine standard value. The Jaffe color reaction was carried out by adding picric acid and an aqueous sodium hydroxide solution, leaving to stand for 15 minutes at ambient temperature and measuring in a cuvette with 2 cm. layer thickness at 546 nm.

FIG. 1 of the accompanying drawings shows graphically the linearity between mg. percent of creatinine and the extinction difference at 546 nm.

EXAMPLE 2

Measurement of creatine by means of creatine kinase

The principle of this embodiment was that, with the help of creatinineamidohydrolase, the creatinine was hydrolyzed to creatine and the creatine formed was phosphorylated, using the method described by M. L. Tanzer (J. of Biol. Chem., 234, 3201/1959), with creatine kinase and ATP, the ADP formed was converted with PEP and PK into ATP and the pyruvate thereby formed was reduced with NADH and lactate dehydrogenase to lactate, with the formation of NAD. The reaction of 1 mol NADH (measurement at 334, 340 or 366 nm) corresponded to the presence of 1 mol creatinine.

For carrying out this method, a reagent mixture, which contained NADH, ATP, PEP and magnesium chloride in 0.11M buffer at pH 9.0, was mixed with lactate dehydrogenase (LDH), pyruvate kinase (PK) and adjusted to 25°C. Serum and creatine kinase were then added and the mixture incubated for a maximum of 30 minutes at the given temperature, the reaction being started by the addition of at least 5 U creatinineamidohydrolase. The decrease in extinction was recorded. The reaction period was 40 to 90 minutes, depending upon the creatinine content. The creatinine content can be calculated directly via the molar extinction coefficients of NADH.

Figure 2:
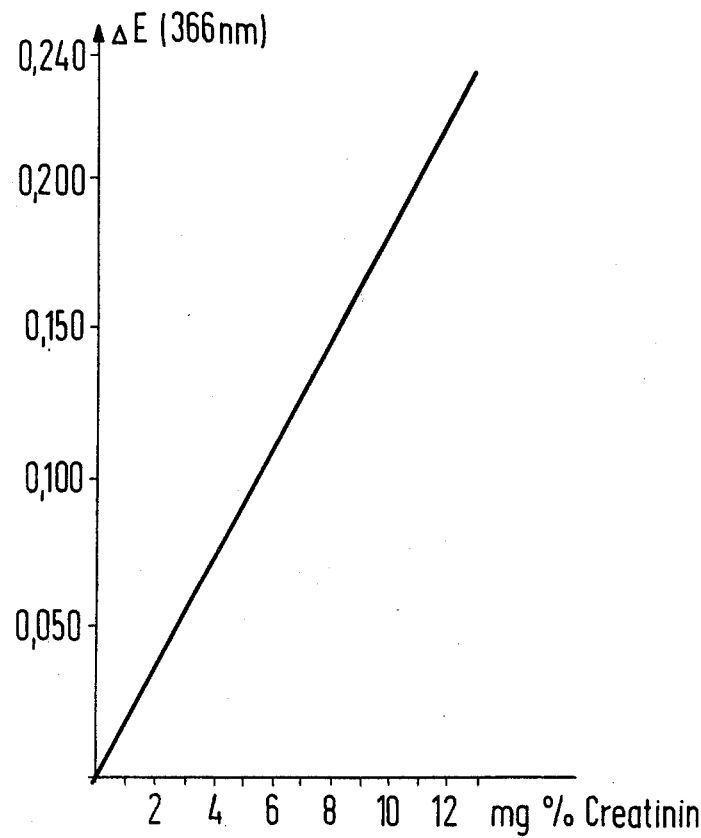

FIG. 2 of the accompanying drawings shows graphically the linearity of this embodiment of the process according to the present invention.

Advantages of this embodiment include a saving of test material by a factor of 10 in comparison with the Jaffe method, a serum blank was not necessary and deproteinization and centrifuging were also not needed.

EXAMPLE 3

Enrichment of active fungal mycelia in a submersed shake culture 2 litres of a nutrient substrate containing, by weight, 1 percent glucose, 0.5 percent creatinine, 0.08 percent ammonium sulfate, 0.02 percent magnesium sulfate heptahydrate, 0.05 percent yeast extract, 1 mg. each of nicotinic acid, thiamine, p-aminobenzoic acid and vitamin $B_6$, 0.1 mg. biotin and traces of iron sulfate, calcium chloride and manganese sulfate, in 0.10M potassium phosphate buffer (pH 6) are inoculated in a shaking flask with 200 ml. of a 48 hours old pre-culture of Penicillium WS 90001 and cultured in a shaking apparatus for 4 days. The creatinine content drops in this time from 0.5 percent weight to scarcely 0.1% by weight and, after this time, the glucose is almost used up. Furthermore, the pH value increases to 7.5 to 8.0. There are thus obtained 3 to 4 g. Penicillium WS 90001 dry weight per litre of culture solution with a content of 45 to 60 IU/g. dry weight of creatinine amidohydrolase.

EXAMPLE 4

In a culture flask containing 15 litres of the nutrient medium described in Example 3 are cultured, with vigorous aeration, 1.5 litres of a well grown pre-culture of Alcaligenes spec. WS 51400. During the whole culturing period, the pH is maintained constant at 7.0. The creatinine and the glucose content are followed continuously. The creatine utilization takes place mainly in the second third of the log phase, whereas the glucose is broken down first. The culture is maintained at 30°C. After 35 hours, 1.5 g. dry bacteria mass can be collected per litre of culture solution. The specific activity of creatinine amidohydrolase is 1600 IU/g. dry weight.

EXAMPLE 5

Alcaligenes spec. WS 51400 is cultured, as described in Example 4, in a working volume of 60 litres. As soon as the desired stage of growth is reached, fresh nutrient substrate is added to the culture vessel and grown culture solution is removed from the culture vessel at the same rate. The dilution rate (flow velocity/working volume) is thereby 0.13 to 0.18 and preferably about 0.16. 500 litres of air are passed through the culture solution per hour. There is thus obtained, by continuous culturing, a yield of 3 to 5 g. dry bacteria mass per litre, with a specific activity such as is obtained by the batch process described in Example 4.

Alcaligenes spec. WS 51400 is thus well suited for continuous culturing in the manner described above.

EXAMPLE 6

Isolation of highly purified creatinine amidohydrolase

The cells (1 kg. dry weight) are separated from a culture batch of Alcaligenes spec. WS 51400 cultured in the presence of creatinine, then made up with 0.1M potassium phosphate buffer (pH 8.0) to 20 litres and, without cooling, digested by high pressure dispersion at a pressure of about 800 ats. The extract is mixed with 5 vol. percent of a 10 percent polyethyleneimine solution (mol. weight about 1800) of pH 8.0 (about 1 litre). After the addition of potassium chloride (0.01M end molarity) and ammonium chloride (0.1M end molarity), there are added, within the course of 10 minutes, 0.8 volumes of 90 percent aqueous isopropanol per litre of extract, followed by stirring for 30 minutes at ambient temperature.

The copious precipitate obtained is centrifuged off, whereafter 0.45 volumes of 90 percent isopropanol are added per litre of supernatant.

The precipitate so formed, which contains creatinine amidohydrolase and creatine amidinohydrolase, is separated off and taken up in 400 ml. 0.02M potassium phosphate buffer (pH 8.0). Undissolved residue is separated off and the supernatant is applied to a diethylaminoethyl-"Sephadex" column (3.5 cm. × 1 m.) which has been equilibrated with the same buffer. Thereafter, the column is washed with 1 vol. 0.1M potassium phosphate buffer (pH 8.0) and then eluted with 0.2M potassium phosphate buffer (pH 8.0). The creatinine amidohydrolase-containing fractions are combined and adjusted at pH 8.0 with ammonium sulfate to 2.2M. The precipitated enzyme is centrifuged off and dissolved in 0.02M diethanolamine buffer (pH 8.0) to give a volume of 100 ml. and then dialyzed for 4 hours at 4°C. against the same buffer. There is thus obtained a total yield of 64 percent of a preparation with a specific activity of 303 U/mg. The following Table I summarizes the activities and yields obtained in the individual steps of this process.

TABLE I

|  | U (25°C.) | protein in g. | U/mg. | yield % |
| --- | --- | --- | --- | --- |
| dispersion digestion | 2.8 × 10⁵ | 98.6 | 2.8 | 100 |

TABLE I-continued

|  | U (25°C.) | protein in g. | U/mg | yield % |
| --- | --- | --- | --- | --- |
| polyethyleneimine supernatant | 2.6 × 10⁵ | 66.2 | 3.9 | 93 |
| first isopropanol addition (supernatant) | 2.16 × 10⁵ | 32.6 | 6.6 | 77 |
| second isopropanol addition (precipitate) | 1.97 × 10⁵ | 6.9 | 28.5 | 71 |
| diethylaminoethyl-"Sephadex" chromatography (eluates) | 1.8 × 10⁵ | 0.59 | 303 | 64 |

When carrying out the digestion ultrasonically, instead of by high pressure dispersion, the content of creatinine amidohydrolase, with about the same specific activity, can be increased 25 fold, referred to the dry weight of the microorganisms used.

The creatinine amidohydrolase obtained as described above has an equilibrium constant [creatine]/[creatinine] : $K = 1.27$ (37°C.; pH 8.0).

The Michealis constant for creatinine as substrate $K_M = 3.3 \times 10^{-2}M$ (37°C.; pH 8.0).

EXAMPLE 7

Separation of creatinine amidohydrolase and creatine amidinohydrolase

The procedure described in Example 6 is repeated. However, after elution of the creatinine amidohydrolase from the exchanger column, the creatine amidinohydrolase is eluted with 0.2M potassium phosphate buffer (pH 8.0), containing 0.3M sodium chloride. The following Table II shows the details.

TABLE II

Separation of creatinine amidohydrolase and creatine amidinohydrolase on diethylaminoethyl-"Sephadex" anion exchanger

| Step | Protein in mg. | creatinine amidohydrolase | | creatine amidinohydrolase | |
| --- | --- | --- | --- | --- | --- |
|  |  | U | U/mg. | U | U/mg. |
| after isopropanol step | 175 | 860 | 4.9 | 44 | 0.25 |
| diethylaminoethyl-"Sephadex" wash water | 90 | 1 | — | 0 | — |
| 0.20M pH 8.0 (eluate) | 29 | 787 | 27 | 0 | — |
| 0.50M pH 8.0 (eluate) | 13.7 | 1.8 | 0.13 | 41 | 3.0 |

EXAMPLE 8

The procedure described in Example 6 is repeated. However, the diethylaminoethyl-"Sephadex" chromatography is replaced by a diethylaminoethyl-"Sephadex" batch process.

Starting from 100 g. Alcaligenes spec. WS 51400, 100 ml. of the second isopropanol precipitate are dissolved in 0.02M potassium phosphate buffer (pH 8.0) and mixed with such an amount of diethylaminoethyl-"Sephadex" that in the supernatant there remain about 5 percent of each of the enzymes (about 20 g. of moist, pressed out exchanger). The exchanger is filtered off, washed with about 100 ml. 0.08M potassium phosphate buffer (pH 8.0) and, for the joint elution of the two enzymes, stirred with 100 ml. 0.2M potassium phosphate buffer (pH 8.0), containing 0.3M potassium chloride, for 15 minutes at 4°C and subsequently filtered. Both enzymes are present in the eluate. The following Table III shows that, by precipitation with ammonium sulfate, there can be obtained a preparation containing 31.5 U/mg. creatinine amidohydrolase and 1.1 U/mg. creatine amidinohydrolase.

TABLE III

Isolation of an enriched enzyme mixture of creatinine amidohydrolase and creatine amidinohydrolase from 100 g. (dry weight) Alcaligenes spec. WS 51400

| Step | Protein in g. | creatinine amidohydrolase U | U/mg. | creatine amidinohydrolase U | U/mg. |
|---|---|---|---|---|---|
| digest | 26.1 | $2.4 \times 10^4$ | 0.92 | $6 \times 10^2$ | 0.023 |
|  | 1.43 | $1.98 \times 10^4$ | 13.9 | $3.8 \times 10^2$ | 0.265 |
| second isopropanol addition (precipitate) |  |  |  |  |  |
| diethylaminoethyl-"Sephadex" eluate 0.5M pH 8.0 | 0.370 | $1.16 \times 10^4$ | 31.5 | $4.1 \times 10^2$ | 1.1 |

EXAMPLE 9

7 g. (dry weight) *Alcaligenes spec.* WS 51400, grown in the presence of creatinine, were collected and digested ultrasonically at pH 8.0. The suspension obtained was mixed, as described in Example 6, with 0.8 volumes isopropanol, stirred for 30 minutes at ambient temperature and centrifuged. The supernatant is mixed with a further 0.45 volumes of isopropanol and again centrifuged. The precipitate is taken up as described in Example 6 and chromatographed over a diethylaminoethyl-"Sephadex" column, only the creatinine amidohydrolase thereby being eluted. The following Table IV shows the details of this process. The preparation obtained was suitable for the determination of creatinine.

TABLE IV

| Step | U (25°C.) | Protein in g. | U/mg. | Yield % |
|---|---|---|---|---|
| ultrasonic digest | $1.5 \times 10^3$ | 1.780 | 0.85 | 100 |
| second isopropanol addition (precipitate) | $1.2 \times 10^3$ | 0.119 | 10.1 | 80 |
| diethylaminoethyl-"Sephadex" eluate | $0.7 \times 10^3$ | 0.028 | 25 | 47 |

In the experiments described in the above Examples 3 to 9, the creatine formed from creatinine in the presence of creatinine amidohydrolase was determined by the addition of adenosine triphosphate (ATP); in the presence of creatine kinase (CK), the creatine is converted into creatine phosphate and adenosine diphosphate (ADP). ADP formed is converted into ATP with pyruvate kinase (PK) and lactate dehydrogenase (LDH), as well as phosphoenol pyruvate (PEP), with the consumption of NADH as measured optically. These known steps can be illustrated as follows:

(1) creatine + ATP $\xrightarrow{CK}$ creatine phosphate + ADP
(2) ADP + PEP $\xrightarrow{PK}$ pyruvate + ATP
(3) pyruvate + NADH + H$^+$ $\xrightarrow{LDH}$ lactate + NAD$^+$ The creatine amidinohydrolase determination was carried out by measurement of the urea formed from creatine, the urea thereby being measured by the urease process.

The Michaelis constant for creatine was determined as follows: $K_M = 5 \times 10^{-2}{}_M$ (25°C.; pH 7.6).

It will be understood that the specification and examples are illustrative but not limitative of the present invention and that other embodiments within the spirit and scope of the invention will suggest themselves to those skilled in the art.

What is claimed is:

1. Process for the determination of creatinine, which process comprises incubating a creatinine-containing sample with creatinine amidohydrolase at a pH above 7 and determining the creatine formed as a measure of the creatinine present in the sample.

2. Process as claimed in claim 1 wherein the creatine formed is determined by the addition of adenosine triphosphate and creatine kinase to result in conversion of the creatine into creatine phosphate and adenosine diphosphate, whereupon the adenosine diphosphate formed in converted into adenosine triphosphate with pyruvate kinase and lactate dehydrogenase as well as phosphoenol pyruvate, with the consumption of NADH being measured optically as a measure of the creatine present.

3. Method of monitoring the efficacy of a process for enriching creatinine amidohydrolase in a mixture containing same by conventional purification or enrichment processes, which method comprises taking a sample of the fraction obtained after a conventional purification step, adding an excess or creatinine thereto, and measuring the ability of said sample to convert the added creatinine into creatine as a measure of the creatinine amidohydrolase present in said sample.

4. Method as claimed in claim 3 wherein the conventional purification step is carried out at a pH of above 7.

5. Method as claimed in claim 3 wherein said purification step is exchange chromatography.

6. Method as claimed in claim 3 wherein the purification step comprises mechanical digestion by means of high pressure dispersion or by use of a digestion mill or ultrasound.

7. Method as claimed in claim 3 wherein said purification step comprises high pressure dispersion carried out at a pressure of from 700 to 800 atmospheres.

8. Method as claimed in claim 3 wherein said purification step comprises digestion at a pH value of about 8.0.

9. Method as claimed in claim 3 wherein said purification step comprises polyanion fractionation.

10. Method as claimed in claim 7 wherein said polyanion fractionation is carried out by way of polyethyleneimine precipitation at a buffer concentration of about 0.1M.

11. Method as claimed in claim 3 wherein said purification step comprises isopropanol fractionation.

12. Method as claimed in claim 11 wherein said isopropanol fractionation is carried out with 90 percent isopropanol at about 25°C.

13. Method as claimed in claim 3 wherein said purification or enrichment process comprises adsorbing the mixture containing creatinine amidohydrolase on a weakly basic ion exchanger at an ion concentration below 0.1M, the exchanger is washed with about 0.1M buffer and creatinine amidohydrolase and creatine amidinohydrolase are eluted with an ion concentration of 0.2M and 0.5M, respectively.

14. Method as claimed in claim 13 wherein the enzymes are adsorbed on the weakly basic ion exchanger at an ion concentration of 0.01 to 0.05M.

15. Method for the specific determination of creatinine in the form of an aqueous solution thereof, which process comprises incubating said aqueous creatinine-containing solution with cratinine amidohydrolase at a pH value from about 7.5 to 9 and determining either the creatine formed or the decrease of creatinine content caused by the incubation reaction.

16. Method as claimed in claim 15 wherein said incubation is carried out in a phosphate or pyrophosphate buffer and the resulting mixture is treated with picric acid and aqueous sodium hydroxide to produce a coloration which is taken as a measure of the creatinine difference.

17. Method as claimed in claim 15 wherein the creatine formed is determined by phosphorylation with creatine kinase and adenosine triphosphate and measurement of the adenosine diphosphate formed.

18. Method as claimed in claim 15 wherein the creatine formed is decomposed in the presence of creatinase, with the formation of urea, and the urea formed is determined in known manner.

19. Method as claimed in claim 15 wherein said pH value is from 7.8 to 8.3.

20. Method as claimed in claim 15 wherein the creatinine-containing solution to be determined in deproteinized and the creatine formed is measured with the use of creatine kinase.

21. Method as claimed in claim 15 wherein said creatinine amidohydrolase is used in admixture with creatinase.

22. Reagent composition for the specific determination of creatinine, which composition comprises
  a. a creatinine standard
  b. picric acid
  c. an aqueous solution of sodium hydroxide
  d. creatinine amidohydrolase.

23. Composition as claimed in claim 22 wherein the said creatinine amidohydrolase is an admixture with a buffer.

24. Composition as claimed in claim 22 wherein said creatinine amidohydrolase is an admixture with amidinohydrolase.

25. Reagent composition as claimed in claim 22 comprising:
  a. buffer, NADH, ATP and phosphoenol pyruvate
  b. lactate dehydrogenase, pyruvate kinase and magnesium chloride.
  c. creatine kinase and
  d. creatinine amidohydrolase.

* * * * *